(12) United States Patent
Yaghoobi et al.

(10) Patent No.: US 11,720,697 B2
(45) Date of Patent: Aug. 8, 2023

(54) METHODS FOR PROVIDING NETWORK ACCESS TO TECHNICAL DATA FILES

(71) Applicant: The Boeing Company, Chicago, IL (US)

(72) Inventors: Ahmad R. Yaghoobi, Issaquah, WA (US); Temourshah Ahmady, Issaquah, WA (US); Joshua Schlager, Renton, WA (US)

(73) Assignee: THE BOEING COMPANY, Arlington, VA (US)

( * ) Notice: Subject to any disclaimer, the term of this patent is extended or adjusted under 35 U.S.C. 154(b) by 502 days.

(21) Appl. No.: 16/828,495

(22) Filed: Mar. 24, 2020

(65) Prior Publication Data

US 2021/0303714 A1 Sep. 30, 2021

(51) Int. Cl.
*H04L 67/06* (2022.01)
*G06F 21/62* (2013.01)
*G06N 20/00* (2019.01)

(52) U.S. Cl.
CPC ......... *G06F 21/6218* (2013.01); *G06N 20/00* (2019.01); *H04L 67/06* (2013.01)

(58) Field of Classification Search
CPC ...... G06F 21/6218; G06N 20/00; H04L 67/06
USPC ........................................................... 726/27
See application file for complete search history.

(56) References Cited

U.S. PATENT DOCUMENTS 9,565,191 B2 2/2017 Allen et al.
10,579,443 B2 * 3/2020 von Muhlen ........... H04L 67/02
10,733,240 B1 * 8/2020 Callahan ................ G06Q 10/10
2004/0117337 A1 6/2004 Beck et al.
(Continued)

FOREIGN PATENT DOCUMENTS

EP 1426870 A2 6/2004
EP 2007032 A2 12/2008

OTHER PUBLICATIONS

"Boeing's Data Security Journey," YouTube Website, Available Online at whttps://www.youtube.com/watch? v=pUOS6wzCGvo &feature=emb_title, Jul. 10, 2019, 11 of pages.
(Continued)

*Primary Examiner* — Dereena T Cattungal
(74) *Attorney, Agent, or Firm* — Alleman Hall Creasman & Tuttle LLP (57) ABSTRACT

A method for providing network access to technical data files is provided herein. The method includes receiving a technical data file via a computer network, and securely storing the technical data file in a network-accessible, access-restricted technical data repository. An unstructured policy document corresponding to the technical data file is computer-analyzed with a previously-trained machine-learning model configured to extract one or more policy attributes from unstructured policy documents. Extracted policy attributes are stored in a network-accessible policy library. A user request to access the technical data file is received via the computer network. One or more attributes of the user are recognized. After verifying that the user attributes do not conflict with the policy attributes stored in the network-accessible policy library or an additional attribute corresponding to the technical data file, the user is provided network access to the technical data file stored in the network-accessible technical data repository.

20 Claims, 6 Drawing Sheets

(56) References Cited

U.S. PATENT DOCUMENTS

2018/0082240 A1* 3/2018 Meyerzon ...... G06Q 10/063112
2020/0076806 A1* 3/2020 Nassar ................ H04L 63/0892
2020/0112568 A1* 4/2020 Pereira .................. G06N 20/00
2021/0288971 A1* 9/2021 Karlberg ............... H04L 63/105

OTHER PUBLICATIONS

Hu, V. et al., "Guide to Attribute Based Access Control (ABAC) Definition and Considerations," National Institute of Standards and Technology Special Publication 800-162, Jan. 2014, 47 pages.

* cited by examiner

METHODS FOR PROVIDING NETWORK ACCESS TO TECHNICAL DATA FILES

FIELD

This invention relates to regulating access to secure documents. In some example implementations, the invention provides attribute-based authorization based on cross-jurisdictional policy information.

BACKGROUND

For global entities, access to information from multiple points in the world is required. Many existing solutions to regulating secure information access do not inherently support fine-grained access control to information resources and data. This may inhibit or prohibit operations at global sites within certain jurisdictions.

Information may be protected through the creation of secure walled off areas. However, these walled-off areas may only be accessible by a small subset of employees of the global entity. As such, for an employee to do their job, they may waste an inordinate amount of time searching for access approvals and/or waiting for access to be granted. This may be detrimental to such global entities.

SUMMARY

To address the above issues, according to one aspect of the present disclosure, a method for providing network access to technical data files is provided. In this aspect, the method includes receiving a technical data file via a computer network, and securely storing the technical data file in a network-accessible technical data repository configured to restrict access to the technical data file. An unstructured policy document corresponding to the technical data file is computer-analyzed with a previously-trained machine-learning model configured to extract one or more policy attributes from unstructured policy documents. Extracted policy attributes are stored in a network-accessible policy library. A request for a user to access the technical data file is received via the computer network. One or more user attributes of the user are recognized. After verifying that the one or more user attributes do not conflict with the one or more policy attributes stored in the network-accessible policy library or an additional attribute corresponding to the technical data file, the user is provided network access to the technical data file stored in the network-accessible technical data repository.

DETAILED DESCRIPTION

Compliance activities for global entities may be particularly complex and tedious due to the need for enforcing complex regulatory compliance and governance processes, increases in cloud and mobile driven interactions, securing global collaborations, and hastening time-to-market related business drivers. One noncompliance incident can cost an entity millions of dollars. As an example, noncompliance to General Data Protection Regulations (GDPR) may cost a company in fines of €20M or 4% of worldwide revenue, whichever is greater.

Such a global entity may need to provide secure, granular access to technical data files for numerous types of employees, contractors, and collaborators that may be stationed around the world. The network security systems governing such access must be capable of supporting the regulatory compliance and contractual requirements of information stakeholders. However, current means of access control and authorization do not support fine-grained access controls to information resources, and are typically implemented within a single jurisdiction.

For example, it may be desirable to collaborate on product designs across the globe and to take advantage of the talents that exist in those global locations. In some cases, the product designs are tied to national security interests. As such, some pieces of a design may have to remain within a first jurisdiction, while other pieces of the design may need to remain within a different jurisdiction in which they were created. Thus, a global network of people, systems, and processes each may be individually subject to various jurisdictional controls.

A mechanism is thus desirable whereby data may be created and moved around the globe while enforcing all of the applied jurisdictional controls without impeding these business objectives. Additionally, there may be cases where there are cross-jurisdictional customers, partners, and/or suppliers working on products, and both intellectual property (IP) and exports may need to be managed for each jurisdiction, while also protecting access to the created data for people located outside those jurisdictions.

Figure 1:
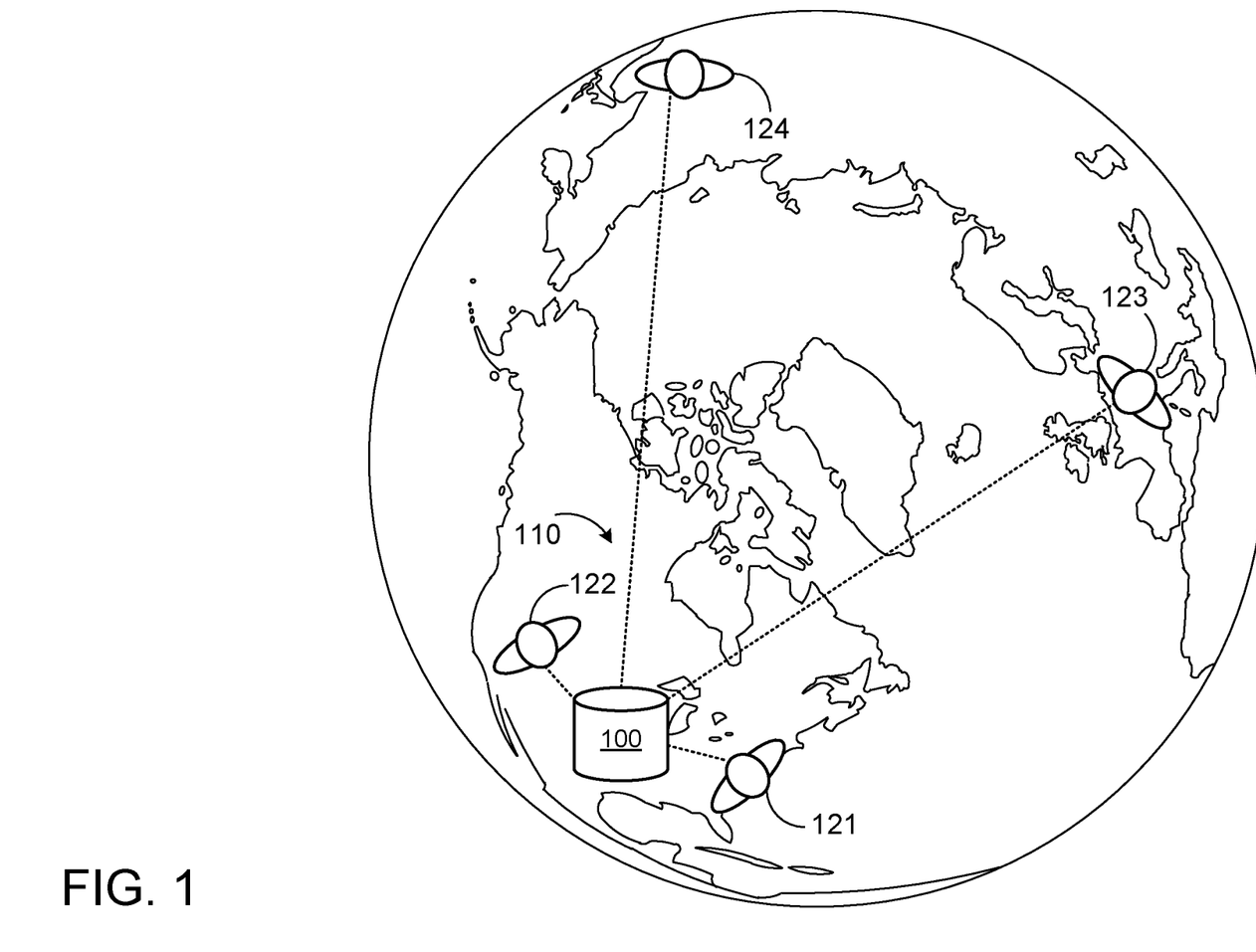
FIG. 1 shows an example technical data repository accessible by a computer network.

For example, FIG. 1 shows a technical data repository 100 positioned in the United States. Technical data repository 100 may be configured to securely hold a plurality of technical data files. Technical data files may include any digital data file holding information that the file owner desires to share with a limited number of users in a secure fashion. Technical data files may include information that pertains to the design and/or manufacture of a tangible article, such as an aircraft, spacecraft, and/or other aeronautical component, such that a skilled artisan would be capable of building or assembling the tangible article given the technical data file(s).

Technical data repository 100 may be accessible via computer network 110. However, access for different users from different points around the globe may be regulated by different policies. As an example, users 121 and 122 are both located in the United States, but may have differing roles, work for different subsidiaries, etc., and thus may be afforded access to different technical data files stored at technical data repository 100.

Users 123 and 124 may be physically located in different jurisdictions from one another and from technical data repository 100, and thus may be subject to different policy regulations regarding access to technical data files stored in technical data repository 100. Even if, for example, user 123 and user 124 were employees having similar roles for the same company, by virtue of their location alone, their level of access may differ based on international policies in place. If user 123 and/or user 124 were a U.S.-based employee traveling abroad, their level of access to certain technical documents may change based on such international policies.

As an example, a U.S.-based manufacturer may desire to contract a supplier located outside of the United States to build a part for a defense-related article. The supplier may need to receive special authorization from the United States Department of Defense (DoD) to build the part, and to receive the technical data files related to the defense-related article. As described in more detail below, the authorization agreement, which may be very complex and semantic in nature, may be processed using machine-learning model(s) in order to allow remote access for that supplier to view the relevant technical data files in an integrated system.

If user 123 attempts to access a particular technical data file from a jurisdiction outside the United States, the authorization system of the present disclosure may compare user 123's credentials to those itemized in the authorization agreement, as extracted using the machine-learning model, to assess access privileges. This may result in approval, denial (e.g., nobody in user 123's jurisdiction is allowed to look at this file), or cross-referencing of additional authorization agreements for this user working under this organization in this jurisdiction for the purpose of accessing this particular technical data file.

Many of the access authorization tasks that involve Export Control (e.g., International Traffic in Arms Regulations (ITAR) and Export Administration Regulations (EAR)), Personally Identifiable Information (PII), IP, Critical Technical Information (CTI) and Customer Entitlement related data have traditionally been done manually. The manual request process is very long and labor intensive, and may thus prohibit operations in particular jurisdictions.

Generally, the three primary types of access control available are Identity-Based Access Control (IBAC), Role-Based Access Control (RBAC), and Attribute-Based Access control (ABAC). IBAC depends on verifying a user's identity. IBAC is typically a permissions-based system where the identity of the user is the primary determinant as to what they can do and what they can access. The approach is simple, but it does not scale easily, and fine-grained access at the user level is not possible.

RBAC uses roles, groups, and permissions. A user can have one or more roles, belong to one or more groups, and inherit permissions from their role and/or group assignment(s). This approach may work well with a medium-sized user base, a small number of applications, and simple access control challenges. However, once the number of roles starts to increase beyond a threshold, the system becomes difficult to manage. Additionally, mechanisms to implement Segregation of Duty across multiple users are typically cumbersome and are not always effective.

ABAC approaches are heavily dependent on collecting and comparing numerous attributes for the user and for the access the user is requesting. Rather than granting access solely based on a user's identity or role, ABAC can grant customized access rights by combining two or more specific attributes. However, expanding and comparing the total number of applied attributes is both labor intensive and difficult to automate. It may be challenging to provide automated application of multiple, overlapping policies to access requests, particularly when the attributes are derived from arcane policies written to communicate information between people, not machines.

Herein, policy-driven systems and methods are employed to solve these deficiencies in ABAC approaches so as to enable access to information from multiple jurisdictions on a global scale with an emphasis on promoting automated regulatory compliance and security. Unstructured policy information may be parsed via machine-learning models to yield structured, searchable policy attributes. User attributes for a user requesting access to secured data within the system may then be compared with the policy attributes to determine whether access should be granted, and if so, with what level of granularity. Results from each request verification may be stored and used to further inform the machine-learning models and decision logic, allowing for easy auditing of, and learning from each access request. These systems and methods allow for policy-driven access regulation, including for examples where attributes are derived from multiple, overlapping policies. This scalable approach enables policy-based granularity at the user level, while ensuring secure cross-jurisdictional access and compliance.

Although described primarily with regard to cross-jurisdictional access within the manufacturing industry, the systems and methods are adaptable across platforms and applications, including cross- and intra-jurisdictional platforms and applications, that rely on policy-driven access control of data and information.

Figure 2:
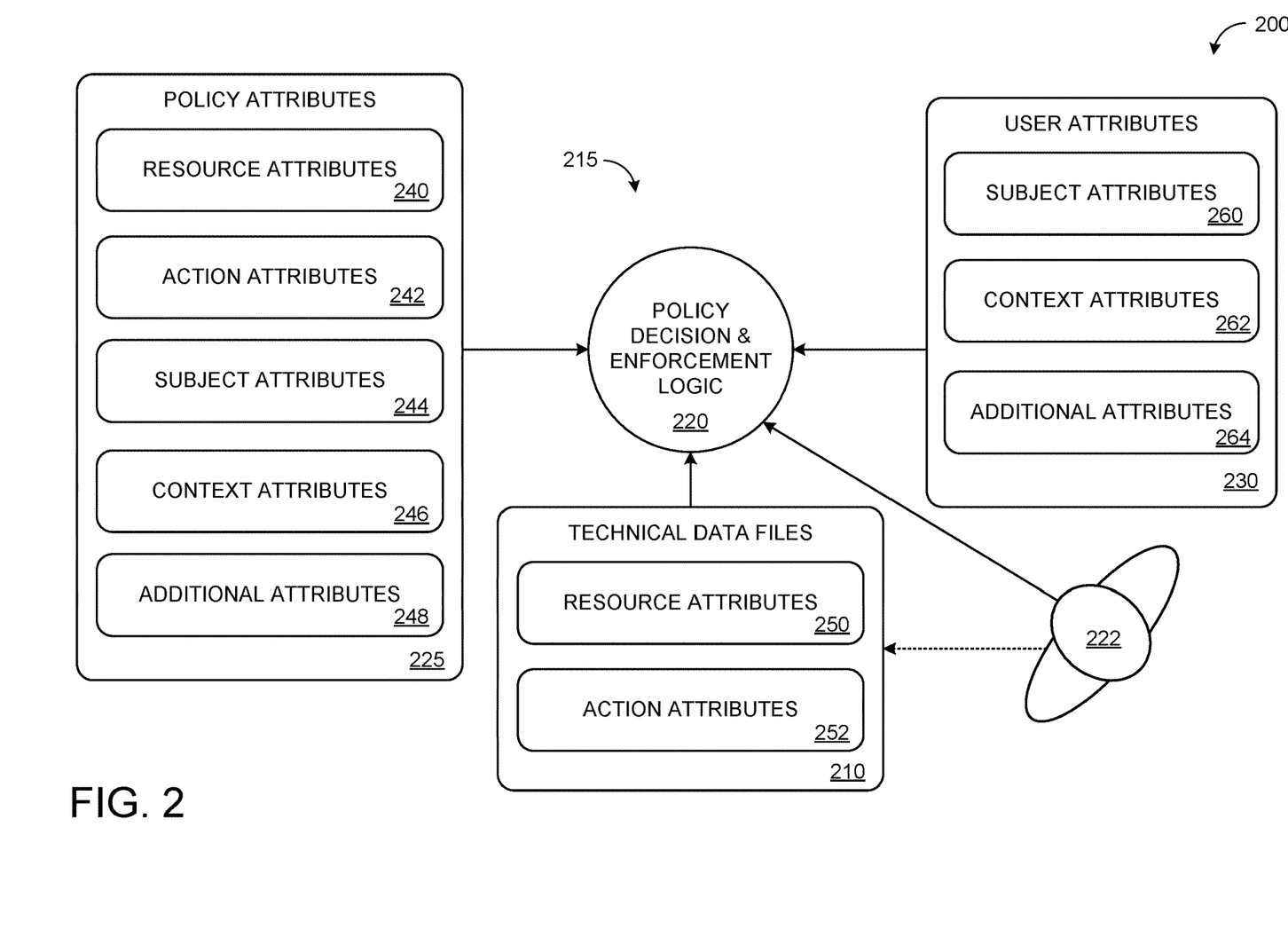
FIG. 2 shows an example system for attribute-based access to technical data files.

FIG. 2 shows an example attribute-based access system 200, wherein access to technical data files 210 over computer network 215 is regulated by policy decision and enforcement logic 220. Policy decision and enforcement logic 220 may grant customized, highly granular rights to a user 222 based on a comparison of policy attributes 225 and user attributes 230.

The comparison may combine two or more specific attributes in order to leverage specific policies and authorization rules with additional fungible attributes, rather than simply granting access based on an identity or a person's role. Additionally, such an attribute-based access system 200 enables the relevant compliance organizations to author, digitize and/or manage access policies in a centralized location.

Policy attributes 225 may include any number of different types that can be combined to render specific policies that apply to individual users 222. As examples, policy attributes 225 may include resource attributes 240, action attributes 242, subject attributes 244, context attributes 246, and/or additional attributes 248.

Resource attributes 240 may refer to attributes of the technical data files being accessed. For example, resource attributes may include financial statements, engineering diagrams, client order details, department, related technical data files, level of security clearance, sensitivity, etc. Action attributes 242 may refer to functions allowed with regard to manipulating each technical data file. For example, action attributes 242 may include view, edit, delete, print, comment, read-only, etc. Such action attributes may be different for technical data files 210 labeled as draft, final, top-secret, etc.

Policy attributes 225 may refer to groups of technical data files. Further, each individual technical data file 210 may include resource attributes 250 and action attributes 252 that are particular for that specific file. There may be multiple resource attributes 250 and action attributes 252 for each technical data file 210, as different end users may be afforded different levels of granularity with regard to each technical data file 210 (view, edit, delete, print, comment, approve, etc.). For example, a senior engineer may be granted broader action attributes than a clerical worker. Action attributes 252 may extend across multiple data files. For example, a user may be restricted from viewing or editing a first file if they already have a second file opened, or if a third file has been opened within a threshold duration. Certain users may only be able to open a certain file for a certain duration, and/or during specific approved hours, if a supervisor is also logged into the system, etc. More complex technical data files 210 may include more complex action attributes, such as restrictions on what kinds of simulations may be run, limits on playback speed and/or viewing resolution, separation of a/v components, etc.

Subject attributes 244 may refer to attributes of each user 222, such as organization, role, title, statement of work (SoW), citizenship, export control classification numbers (ECCN), etc. Context attributes 246 may refer to temporal attributes for user access, such as time, office, country, etc. For example, certain policies may change or sunset over time. Access to certain technical data files may be allowed for certain jurisdictions, but not within others. Access may be restricted to particular applications and/or browser types, to computer networks with a particular level of security, etc.

A user 222 may request access to an individual or set of technical data files. In doing so, user attributes 230 may be input to policy decision and enforcement logic 220. User attributes 230 may include subject attributes 260, context attributes 262, and additional attributes 264 that describe the attributes of the particular user 222, their accession system, location, etc. Upon receiving the request, policy decision and enforcement logic 220 may compare user attributes 230 to the relevant policy attributes 225, and compare resource attributes 250 for the technical data files 210 with resource attributes 240, and compare action attributes 252 for technical data files 210 with action attributes 242.

Based on those comparisons, access may be authorized, denied, or indicated to be indeterminate. For example, if the policy is jurisdiction-specific, and the requesting user is located in a non-authorized jurisdiction, or if the user's location cannot be determined, the user will be denied access. Some users will be granted access to the technical data file for certain purposes, but not for other purposes. In some examples, an indeterminate judgement will be followed by a closer parsing of additional attributes 264 associated with user 222.

Figure 3:
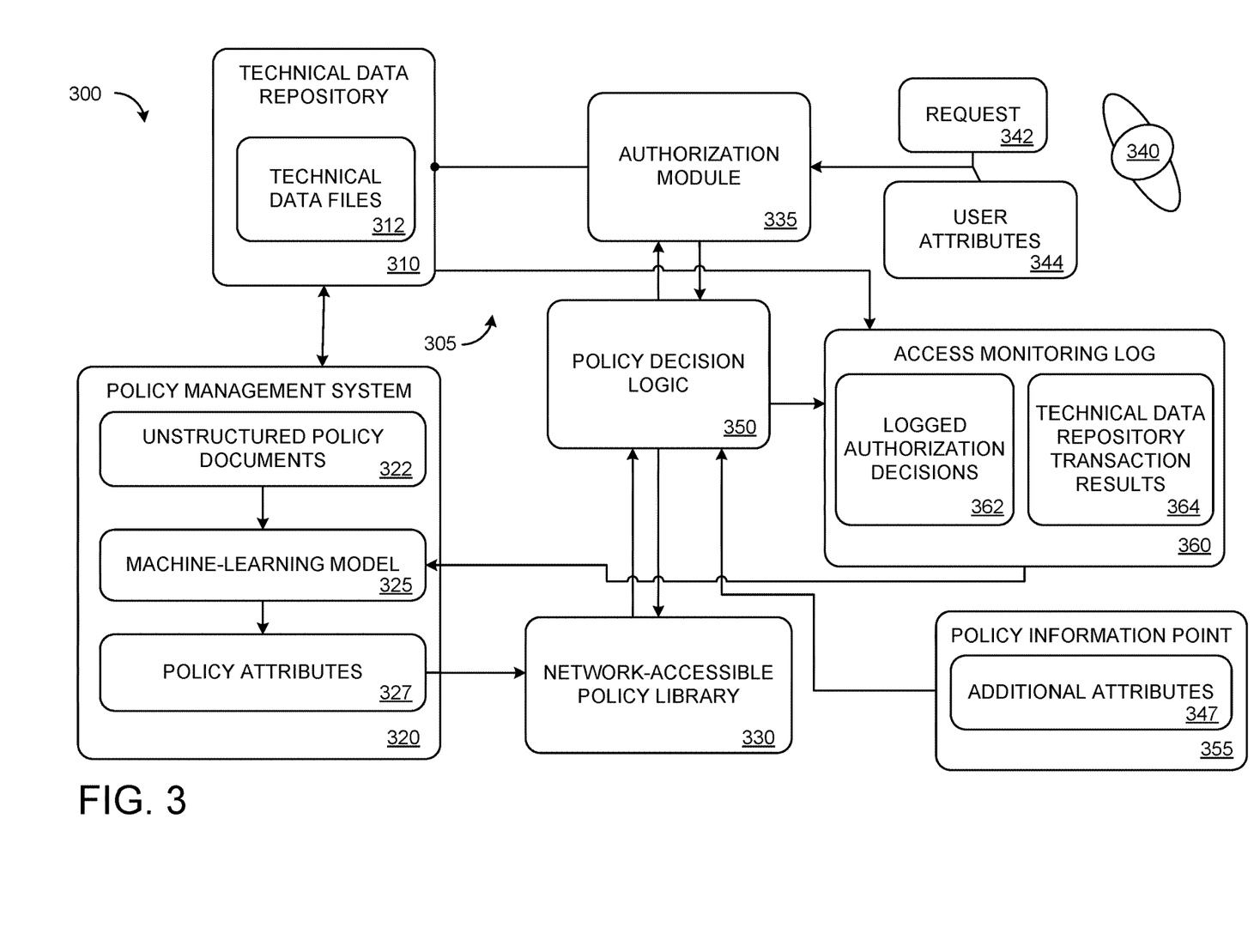
FIG. 3 shows an example system for providing secure, policy-based access to technical data files.

FIG. 3 schematically shows a system 300 for regulating access to a technical data file over a computer network 305. System 300 may be implemented as a part of a unified engineering system having a remote access instance. System 300 may be a standalone system, and/or some or all portions of system 300 may be integrated with pre-existing systems as a means of regulating secure access to files, databases, and/or other types of cataloged information.

System 300 may include a network-accessible technical data repository 310 configured to receive one or more of a plurality of technical data files 312 over computer network 305. Technical data repository 310 may be further configured to securely store technical data files 312, and to restrict access to technical data files 312. Technical data repository 310 may include a secure database or file repository with any suitable entry point configuration that is amenable to access controls enforced by system 300. The network-accessible technical data repository 310 may utilize robust cryptographic encryption.

System 300 further includes policy management system 320. Policy management system may be configured to computer-analyze unstructured policy documents 322 corresponding to one or more technical data files 312 with a previously-trained machine-learning model 325 configured to extract policy attributes 327 from the unstructured policy documents 322.

An example policy management system 320 may contain any newly identified and a totality of all published and digitized policies related to technical data files 312. Policy management system 320 may be curated by one or more compliance organizations which may input unstructured policy documents 322 into policy management system 320. Machine learning model 325 may then digitize and validate the policy documents (e.g., using optical character recognition (OCR) and/or natural language processing (NLP)), extract policy attributes 327, and render policy attributes 327 into a structured format that is digestible by system 300. Policy attributes 327 extracted from unstructured policy documents 322 may then be stored in a network-accessible policy library 330.

Unstructured policy documents 322 may include, but are not limited to, data authorization policies for policies such as export administration regulations (EAR), international traffic in arms regulations (ITAR), licenses for personally identifiable information (PII), intellectual property & critical technical information (IP/CTI) as well as any number of services enabled with a utilization count. Unstructured policy documents 322 may collectively govern access to technical data files 312.

Policy attributes 327 that are extracted from the unstructured policy document may be associated with predetermined attribute fields indicated by the previously-trained machine learning model, and wherein the policy management system is further configured to output structured, field-labeled policy attributes for storage in the network-accessible policy library.

Each unstructured policy document 322 may be a non-coded, non-technical (i.e., written using human-readable language) document that specifies the legal, licensed, and/or contractual authority for a user to access technical data files 312. Machine learning model 325 may receive this unstructured, natural language information and translate it so that it may be applied in a machine based automated context to provide a simple accept/deny response to an access request.

In some examples, unstructured policy documents 322 may be received in conjunction with corresponding technical data files 312 or vice-versa, and/or technical data files 312 may include metadata that are explicitly referred to within unstructured policy documents 322 (e.g., project names, accession numbers). However, authorizations may not necessarily be specific to a technical data file. As such, the relationship between policy, data file, and user may be descriptive and semantic in nature. Those relationships may then be parsed, coded, and applied so that the authorization has a specific meaning for particular users 340 in conjunction with particular technical data files 312. As such, technical data files may also be parsed by machine-learning model 325 in order to derive attributes that can be associated and/or linked to specific unstructured policy documents 322.

Machine-learning model 325 may thus be trained for natural language processing, artificial intelligence, and/or other machine-learning and/or statistical techniques to translate an unstructured, human-readable, policy document into a machine-readable format upon which access decisions can be made. Recognizing that a particular sentence can be written in numerous different ways and convey the same meaning, and that different communities establish different language verticals, and that language interpretation that would apply to contracts may be different than the language interpretation that would apply to export licenses, the machine-learning model may be trained to extract the meaning in addition to or instead of the specific wording within a document. This meaning can then be compared to another authorization that may use different terminology. Accordingly, machine-learning model 325 may be trained on ontology and terminology from multiple language verticals, and then be configured to apply the same context and meaning to disparate terms so that access decisions may be consistently applied regardless of the language, format, and/or other characteristics of the underlying unstructured policy document(s).

For example, machine-learning model 325 may be trained to recognize policy attributes of a first type from a plurality of unstructured policy documents of the first type, and to recognize policy attributes of a second type from a plurality of unstructured policy documents of the second type, etc. An integrated set of attribute fields may then be generated based on sets of policy attributes from a plurality of types. For example, if legal documents refer to something as a party, and defense documents use the term subject to mean the same thing, machine-learning model 325 may align those terms within a single attribute field so it can gleam the meaning of different language verticals even if the inherent vocabularies are distinct and separate. This can be accomplished by labelling "party" and "subject" data with a consistent label when assembling training data.

Once an integrated set of attribute fields is established, machine-learning model 325 may be presented with training data including a plurality of unstructured policy documents 322 that have been annotated with appropriate labels and/or other training metadata.

Machine-learning model 325 may be trained using any suitable combination of state-of-the-art and/or future machine learning (ML), artificial intelligence (AI), and/or natural language processing (NLP) techniques. As a non-limiting example, Machine-learning model 325 may be trained using an NLP system configured to extract information from any suitable computer-readable text (e.g., from unstructured textual documents) using any suitable combination of ML, AI, and/or NLP techniques. For example, the NLP system may be configured to metadata-tag such extracted information, for example to generate field-labeled data. The NLP system may be configured, for example via machine-learning training, to handle computer-readable text drawn from a plurality of different ontologies.

For example, an ontology may include any suitable computer-readable and/or human-readable schema, type system, and/or knowledge base configured to represent relationships among concepts associated with the ontology. An ontology may be a domain-agnostic ontology, and/or a domain-specific ontology configured with regard to any suitable subject domain (e.g., commercial domain, legal domain, defense domain). In some examples, a dataset-specific ontology may be used for any suitable set of data, irrespective of any specific topic/domain (e.g., an ontology for data derived from a particular government database). In some examples, data (e.g., computer-readable text, metadata-tags, and/or field labels) for the plurality of ontologies may be stored in a common (e.g., ontology-agnostic) database.

In some examples, the NLP system may include an ontology-agnostic language model. Alternately or additionally, in some examples, the NLP system may include a plurality of ontology-specific language models. For example, each of the ontology-specific language models may be machine-learning trained on an ontology-specific dataset associated with a specific ontology. Non-limiting examples of an ontology-specific language model may include a graphical model (e.g., a probabilistic graphical model, a constraint graph, a Markov model, and/or any other suitable graphical model), a decision tree, and/or a neural network. In some examples, a language model (e.g., an ontology-agnostic or ontology-specific language model) may be an ensemble model based on a plurality of models. For example, an ontology-agnostic language model may include a plurality of ontology-specific language models.

Non-limiting examples of techniques that may be incorporated in an implementation of one or more methods of the present disclosure include support vector machines, multi-layer neural networks, convolutional neural networks (e.g., including spatial convolutional networks for processing location-specific information appearing at specific locations within a document (e.g., bar codes in a top right header of a document), temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the machine learning training process may include one or more methods that may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

As an example, training data for the machine-learning training may include a database including one or more ontology-specific datasets, each ontology-specific dataset including computer-readable text (e.g., unstructured documents), metadata tags, field labels, and/or other information.

For example, the machine-learning training may include supervised training (e.g., training to recognize a field label given an unstructured document, based on supervised training data comprising unstructured documents along with corresponding field labels provided by human annotators), and/or unsupervised training (e.g., training to recognize and/or predict natural-language features of unstructured documents from an ontology-specific dataset). The machine learning training may also be configured to consider multiple unstructured documents in tandem. For example, two or more unstructured policy documents 322 may apply to each individual technical data file 312. Multiple policies and thus multiple unstructured documents may be inter-related, overlapping, and/or conjoined. Some of these policies may outrank others, while some policies may only be considered when taken in conjunction with another policy.

In some examples, policy documents may be derived from audio and/or video files, and in such cases audio and/or video may be analyzed to extract computer-readable text (e.g., via speech-to-text) and/or to verify speaker identity/authenticity (e.g., to verify that a policy directive originates from an appropriate authority). In some examples, when an access decision cannot be made from currently available information, the system may be configured to communicate with an access-providing authority, and such communication may, in some examples, be carried out using natural language conversation between the requesting computer system and the human, access-providing authority. Language models may be implemented using any suitable ML, AI, and/or NLP techniques. For example, language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, a language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

When processing policy and/or authorizations containing audio and/or video, the language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

Once trained, unlabeled and unstructured policy documents may be presented to machine-learning model 325. Machine-learning model 325 may computer-analyze an unstructured policy document 322 of any type corresponding to a technical data file 312 by automatically extracting policy attributes 327 from the unstructured policy document 322. The extracted policy attributes 327 may be associated with the integrated set of attribute fields. For example, extracted policy attributes 327 may be metadata labeled for the appropriate attribute field(s) so as to be searchable responsive to an access request. Machine learning model 325 may then generate a set of structured documents that is coded and field-labeled, and from which structured, field-labeled policy attributes 327 are output for storage in a network-accessible policy library 330.

Authorization module 335 may provide an interface for a user 340 to request access to technical data files 312. Authorization module 335 may be configured to receive a request 342 for user 340 to access technical data files 312, to recognize one or more user attributes 344 of user 340, and to provide the user network access to technical data files 312 stored in technical data repository 310 after verifying that the one or more user attributes 344 do not conflict with the policy attributes 327 stored in the network-accessible policy library 330 or any additional attributes 347 corresponding to technical data files 312. User attributes 344 may be stored at network-accessible policy library 330, or any other secure, network-accessible database. User attributes 344 may be retrieved based on a user identification (e.g., username and password, fingerprint, retinal scan, combined security measures, etc.). Each individual user 340 may not be granted access to generate, edit, or alter their own user attributed 344. As such, the user attributes 344 may be secured, dynamic, and unfakable.

Authorization module 335 may be a web-portal, web-application, standalone application, ftp portal, application programming interface (API), or any other suitable secure software interface. Authorization module 335 may apply cryptography to technical data repository 310, for example by encrypting technical data files 312 at rest, then providing a key to user 340 to decrypt technical data files 312 responsive to a successful verification of user attributes 344 against policy attributes 327.

As an example, authorization module 335 may receive a request 342, convert request 342 into an access request associated with a plurality of user attributes 344, and send the access request to policy decision logic 350. As described with regard to FIG. 2, user attributes 344 may include subject attributes, context attributes, and/or additional attributes.

Policy decision logic 350 may evaluate request 342 and user attributes 344 against the policy attributes 327, and then make an active determination whether to grant user 340 access to technical data files 312. An authorization decision may then be returned to authorization module 335.

In scenarios wherein the authorization decision indicates to grant the request 342, authorization module 335 may then provide granular access to technical data files 312, For example, a level of granularity provided to user 340 may be determined based on policy attributes 327, and one or more user attributes 344. For example, as described with regard to FIG. 2, some users may be provided greater access and abilities to edit or manipulate technical data files 312, whereas other users may only be able to view or read technical data files 312.

In some examples, the one or more user attributes 344 may not conflict with the policy attributes 327 stored in the network-accessible policy library 330 for the requested technical data file 312, but are insufficient to provide user 340 network access to the technical data file 312 stored in the technical data repository 310. Responsive to such a condition, system 300 may retrieve additional attributes 347 stored in a network-accessible policy information point 355. In some examples, additional attributes 347 may be generated via machine-learning model 325.

For example, an engineering firm may be contracted to access certain technical data files 312. However, the contract may not be specific to certain users, and the engineering firm may include relevant engineers, irrelevant engineers, basic employees, etc. Firms and contractors may submit relevant firm information to policy management system 320. Machine-learning model 325 may then be employed to apply natural language approaches to internal firm documentation so as to use graph data to track those internal relationships with complex relationships.

Thus, the relationship between a user 340 requesting access and the parent firm may be closely inspected. Such data may be aggregated at policy information point 355 in the form of additional attributes 347. Data for new users aiming to access technical data repository 310 may be fed into this system.

Such documentation may be stored in remote databases or locally in an SQL server or other database. By applying semantics and graphs to that documentation, metadata and many of the same functions applied to policy documentation may be applied for cataloging data to generate those relationships and to maintain that data in the policy information point 355. As with policy attributes 327, additional attributes 347 may be updated periodically to ensure current users and relationships are properly and securely represented.

Additional attributes 347 may then serve to fill in missing attribute data. After verifying that there is no conflict among the additional attributes 347, the one or more user attributes 344, and the policy attributes 327 stored in the network-accessible policy library 330 for the technical data file 312, an access request may be granted. If the comparison of additional attributes to policy attributes 327 does yield conflict, request 342 may be denied.

An access monitoring log 360 may be configured to store logged authorization decisions 362 corresponding to the technical data file. By logging and recording each logged authorization decision 362, access monitoring log 360 may enable system 300 to perform potential audits in the future, provide logging traceability, and enable authorization analytics to be performed. Logged authorization decisions 362 may include information pertaining to the number of granted requests, the number of denied requests, the number of requests that required retrieval of additional attributes 347, etc. Logged authorization decisions 362 may include metadata pertaining to user, policy, and/or technical data attributes, which may be anonymized for analysis by off-board analytics software in some examples.

Access monitoring log 360 may enable the generation of a closed loop of validation for each type of access request within system 300, as well as the use of analytics on logged authorization decisions 362 to determine whether a certain type of access is occurring, how frequently it is occurring, and whether it can be escalated.

In addition to access requests, the results of each transaction within system 300 may be stored in technical data repository transaction results 364. For example, technical data repository transaction results 364 may include, but are not limited to, system logs, server logs, application logs, database logs, etc. Analytics may be applied to these results as they are being generated in real-time or near real-time, and notifications and/or alerts may be automatically issued in response to the detection of abnormalities. For example, a user 340 issuing repeated requests 342 to access a technical data file 312 following repeated denials may be flagged (e.g., flag any three consecutive denials in a day). The thresholds for any such abnormality warnings may be set to fit any particular application.

In some examples, the previously-trained machine-learning model 325 may be updated based on contents of the access monitoring log. For example, if new policy attributes 327 have been added to network-accessible policy library 330, and particular user attributes 344 are shown to be in conflict with policy attributes 327 despite semantic similarity, an event may be triggered to launch an attempt to close that access gap. This could include re-digitization of the parent unstructured policy document 322, re-labeling policy attributes 327, etc. This may enable acceleration of policy attribute extraction without requiring policy administrators and auditors to absorb and sift through considerable amounts of irrelevant logging information. In some examples, such as when the log data represents numerous types of data, users, domains, etc., or where the log data contains sensitive information, this analysis may be automatically mediated by system 300. However, in some instances, log data may be packaged and provided to auditors who analyze the data and update machine-learning model 325.

System 300 may provide a policy management, authorization service, and process framework that enables dynamic, fine-grained, context-aware, risk-intelligent, and compliant global access to integrated data platforms and services within the constraints of international government regulations and protected business assets. System 300 is applicable for large scale use cases with sensitive compliance and security requirements. System 300 may enable secure access through an automated decision tree, as well as via the implementation of compliance rules that help to manage access on such a large scale.

System 300 may be enacted as a discreet service in and of itself that can accept requests from a plurality of disparate databases and transactional systems and respond to those requests with either approval or denial of access, or elevate the request and require additional information before that request can be granted. System 300 may additionally or alternatively be consumed by an outside system, such as an engineering system, finance system, cloud service, or any process where a system is consuming data for display to a person. For example, system 300 may be integrated with previously standalone application, such as systems for product lifecycle management, manufacturing operations management, and/or enterprise resource planning.

Figure 4:
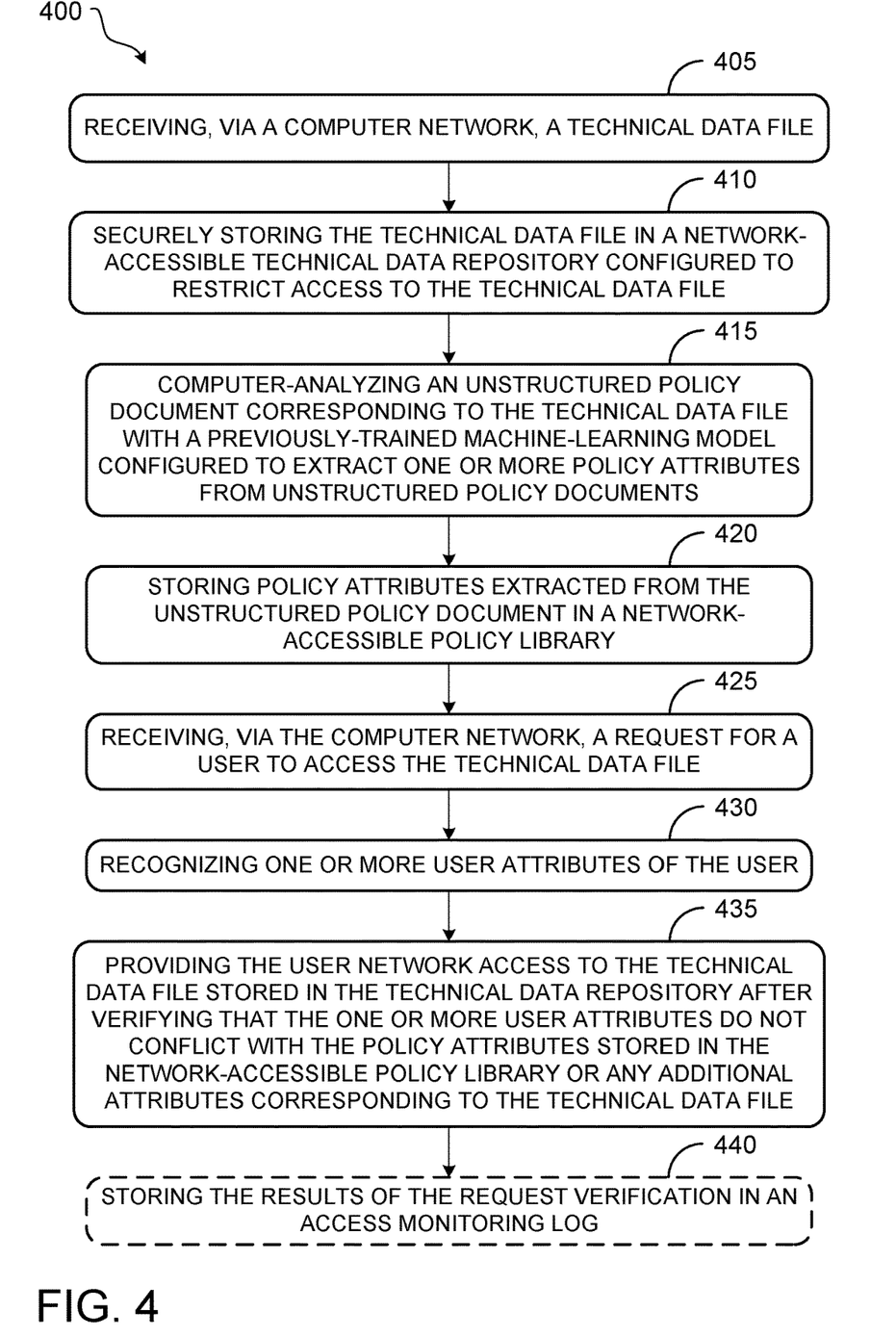
FIG. 4 shows an example method for providing secure network access to a technical data file.

FIG. 4 shows an example method 400 for providing secure network access to a technical data file. Method 400 may be executed by one or more computing systems, such as system 300 depicted in FIG. 3.

At 405, method 400 includes receiving, via a computer network, a technical data file. At 410, method 400 includes securely storing the technical data file in a network-accessible technical data repository configured to restrict access to the technical data file. At 415, method 400 includes computer-analyzing an unstructured policy document corresponding to the technical data file with a previously-trained machine-learning model configured to extract one or more policy attributes from unstructured policy documents.

At 420, method 400 includes storing the one or more policy attributes extracted from the unstructured policy document in a network-accessible policy library. In some examples, the policy attributes extracted from the unstructured policy document may be associated with predetermined attribute fields indicated by the previously-trained machine learning model. Structured, field-labeled policy attributes may then be output for storage in the network-accessible policy library.

At 425, method 400 includes receiving, via the computer network, a request for a user to access the technical data file. At 430, method 400 includes recognizing one or more user attributes of the user. For example, the one or more user attributes may include at least subject attributes related to the credentials of the user. Additionally or alternatively, the one or more user attributes may include at least context attributes related to metadata associated with the request for access. For example, the policy attributes may include at least subject attributes related to the credentials of the user, context attributes related to metadata associated with the request for access, and/or action attributes related to the level of granularity.

At 435, method 400 includes providing the user network access to the technical data file stored in the network-accessible technical data repository after verifying that the one or more user attributes do not conflict with the policy attributes stored in the network-accessible policy library or an additional attribute corresponding to the technical data file. In some examples, method 400 includes providing granular access to the technical data file, wherein a level of granularity provided to the user is determined based on the one or more policy attributes and the one or more user attributes.

Optionally, at 440, method 400 includes storing the results of each request verification in an access monitoring log. Additionally or alternatively, the results of a transaction related to the network-accessible technical data repository may be stored in the access monitoring log. In some examples, the previously-trained machine-learning model is updated based on contents of the access monitoring log configured to store logged authorization decisions corresponding to the technical data file.

In some examples, method 400 additionally or alternatively includes, responsive to a first condition wherein the one or more user attributes do not conflict with the one or more policy attributes stored in the network-accessible policy library for the technical data file, but are insufficient to provide the user network access to the technical data file stored in the network-accessible technical data repository, retrieving additional attributes stored in a network-accessible policy information point; and In some examples, method 400 additionally or alternatively includes providing the user network access to the technical data file stored in the network-accessible technical data repository after verifying that there is no conflict among the additional attributes, the one or more user attributes, and the one or more policy attributes stored in the network-accessible policy library for the technical data file.

Figure 5:
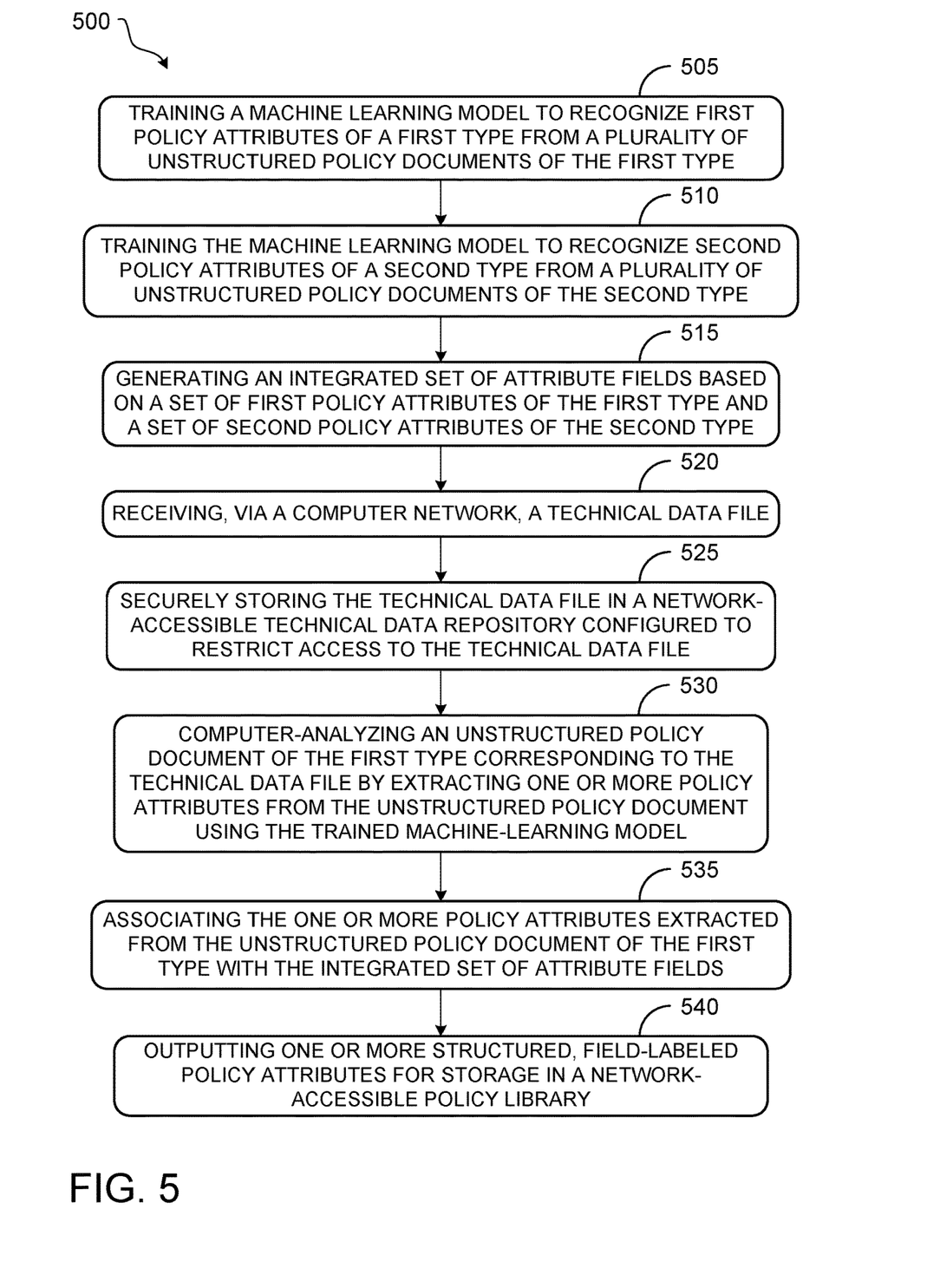
FIG. 5 shows an example method for regulating access to technical data files based on policy documents of multiple types.

FIG. 5 shows an example method 500 for regulating access to technical data files based on policy documents of multiple types. Method 500 may be executed by one or more computing systems, such as system 300 depicted in FIG. 3.

At 505, method 500 includes training a machine learning model to recognize first policy attributes of a first type from a plurality of unstructured policy documents of the first type. At 510, method 500 includes training the machine learning model to recognize second policy attributes of a second type from a plurality of unstructured policy documents of the second type. For example, the unstructured policy document types may include legal documents, defense documents, contract documents, license agreements, etc. At 515, method 500 includes generating an integrated set of attribute fields based on a set of the policy attributes of the first type and a set of the policy attributes of the second type. In this way, access technical data files may be evaluated against multiple policy types simultaneously.

At 520, method 500 includes receiving, via a computer network, a technical data file. At 525, method 500 includes securely storing the technical data file in a network-accessible technical data repository configured to restrict access to the technical data file.

At 530, method 500 includes computer-analyzing an unstructured policy document of the first type corresponding to the technical data file by extracting one or more policy attributes from the unstructured policy document using the trained machine-learning model. At 535, method 500 includes associating the one or more policy attributes extracted from the unstructured policy document of the first type with the integrated set of attribute fields. At 540, method 500 includes outputting one or more structured, field-labeled policy attributes for storage in a network-accessible policy library.

In some examples, method 500 additionally includes, receiving, via the computer network, a request for a user to access the technical data file, and recognizing one or more user attributes of the user. Method 500 may additionally include providing the user network access to the technical data file stored in the network-accessible technical data repository after verifying that the one or more user attributes do not conflict with the one or more structured field-labeled policy attributes stored in the network-accessible policy library or any additional attributes corresponding to the technical data file.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
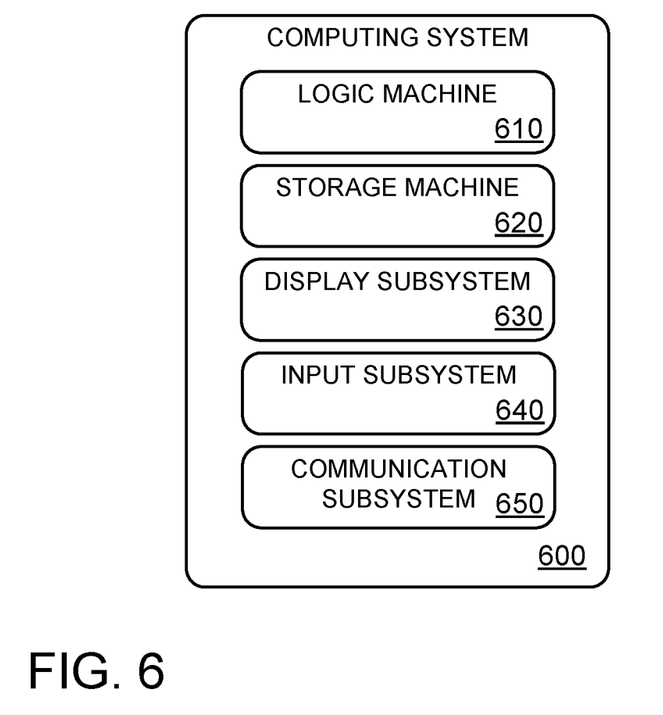
FIG. 6 shows an example computing environment in which the systems of FIGS. 1, 2, and 3 may be enacted.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In one example, a method is presented. The method includes receiving, via a computer network, a technical data file; securely storing the technical data file in a network-accessible technical data repository configured to restrict access to the technical data file; computer-analyzing an unstructured policy document corresponding to the technical data file with a previously-trained machine-learning model configured to extract one or more policy attributes from unstructured policy documents; storing the one or more policy attributes extracted from the unstructured policy document in a network-accessible policy library; receiving, via the computer network, a request for a user to access the technical data file; recognizing one or more user attributes of the user; and providing the user network access to the technical data file stored in the network-accessible technical data repository after verifying that the one or more user attributes do not conflict with the one or more policy attributes stored in the network-accessible policy library or any additional attributes corresponding to the technical data file. In such an example, or any other example, the results of a request verification is additionally or alternatively stored in an access monitoring log. In any of the preceding examples, or any other example, the results of a transaction related to the network-accessible technical data repository is additionally or alternatively stored in the access monitoring log. In any of the preceding examples, or any other example, the previously-trained machine-learning model is additionally or alternatively updated based on contents of an access monitoring log configured to store logged authorization decisions corresponding to the technical data file. In any of the preceding examples, or any other example, providing the user network access to the technical data file stored in the network-accessible technical data repository additionally or alternatively comprises providing granular access to the technical data file, and wherein a level of granularity provided to the user is determined based on the one or more policy attributes and the one or more user attributes. In any of the preceding examples, or any other example, the one or more user attributes additionally or alternatively comprise at least subject attributes related to the credentials of the user. In any of the preceding examples, or any other example, the one or more user attributes additionally or alternatively comprise at least context attributes related to metadata associated with the request for access. In any of the preceding examples, or any other example, the one or more policy attributes additionally or alternatively comprise at least subject attributes related to credentials of the user. In any of the preceding examples, or any other example, the one or more policy attributes additionally or alternatively comprise at least context attributes related to metadata associated with the request for access. In any of the preceding examples, or any other example, the one or more policy attributes additionally or alternatively comprise at least action attributes related to the level of granularity. In any of the preceding examples, or any other example, the method additionally or alternatively comprises, responsive to a first condition wherein the one or more user attributes do not conflict with the one or more policy attributes stored in the network-accessible policy library for the technical data file, but are insufficient to provide the user network access to the technical data file stored in the network-accessible technical data repository, retrieving additional attributes stored in a network-accessible policy information point; and providing the user network access to the technical data file stored in the network-accessible technical data repository after verifying that there is no conflict among the additional attributes, the one or more user attributes, and the one or more policy attributes stored in the network-accessible policy library for the technical data file. In any of the preceding examples, or any other example, the method additionally or alternatively comprises associating the one or more policy attributes extracted from the unstructured policy document with predetermined attribute fields indicated by the previously-trained machine learning model; and outputting one or more structured, field-labeled policy attributes for storage in the network-accessible policy library.

In another example, a system is presented, the system comprising a network-accessible technical data repository configured to receive a technical data file over a computer network, to securely store the technical data file, and to restrict access to the technical data file; a policy management system configured to computer-analyze an unstructured policy document corresponding to the technical data file with a previously-trained machine-learning model configured to extract one or more policy attributes from unstructured policy documents; a network-accessible policy library configured to store the one or more policy attributes extracted from the unstructured policy document; and an authorization module configured to receive a request for a user to access the technical data file, to recognize one or more user attributes of the user, and to provide the user network access to the technical data file stored in the network-accessible technical data repository after verifying that the one or more user attributes do not conflict with the one or more policy attributes stored in the network-accessible policy library or an additional attribute corresponding to the technical data file. In such an example, or any other example, the system further comprises an access monitoring log configured to store logged authorization decisions corresponding to the technical data file. In any of the preceding examples, or any other example, the previously-trained machine-learning model is additionally or alternatively updated based on contents of the access monitoring log. In any of the preceding examples, or any other example, the network-accessible technical data repository is additionally or alternatively located in a first jurisdiction, wherein the user is located in a second jurisdiction, and wherein the unstructured policy document governs access to the technical data file for users located in the second jurisdiction. In any of the preceding examples, or any other example, the authorization module is additionally or alternatively configured to, responsive to a first condition wherein the one or more user attributes do not conflict with the one or more policy attributes stored in the network-accessible policy library for the technical data file, but are insufficient to provide the user network access to the technical data file stored in the network-accessible technical data repository, retrieve additional attributes stored in a network-accessible policy information point; and provide the user network access to the network-accessible technical data file stored in the technical data repository after verifying that there is no conflict among the additional attributes, the one or more user attributes, and the one or more policy attributes stored in the network-accessible policy library for the technical data file. In any of the preceding examples, or any other example, the one or more policy attributes extracted from the unstructured policy document are additionally or alternatively associated with predetermined attribute fields indicated by the previously-trained machine learning model, and wherein the policy management system is further configured to output one or more structured, field-labeled policy attributes for storage in the network-accessible policy library.

In yet another example, a method is presented, the method comprising training a machine learning model to recognize first policy attributes of a first type from a plurality of unstructured policy documents of the first type; training the machine learning model to recognize second policy attributes of a second type from a plurality of unstructured policy documents of the second type; generating an integrated set of attribute fields based on a set of policy attributes of the first type and a set of policy attributes of the second type; receiving, via a computer network, a technical data file; securely storing the technical data file in a network-accessible technical data repository configured to restrict access to the technical data file; computer-analyzing an unstructured policy document of the first type corresponding to the technical data file by extracting one or more policy attributes from the unstructured policy document using the trained machine-learning model; associating the one or more policy attributes extracted from the unstructured policy document of the first type with the integrated set of attribute fields; and outputting one or more structured, field-labeled policy attributes for storage in a network-accessible policy library. In such an example, or any other example, the method may additionally or alternatively comprise receiving, via the computer network, a request for a user to access the technical data file; recognizing one or more user attributes of the user; and providing the user network access to the technical data file stored in the network-accessible technical data repository after verifying that the one or more user attributes do not conflict with the one or more structured, field-labeled policy attributes stored in the network-accessible policy library or any additional attributes corresponding to the technical data file.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
receiving, via a computer network, a technical data file;
securely storing the technical data file in a network-accessible technical data repository configured to restrict access to the technical data file;
computer-analyzing an unstructured policy document corresponding to the technical data file with a previously-trained machine-learning model configured to extract one or more policy attributes from unstructured policy documents;
associating the one or more policy attributes with predetermined attribute fields indicated by the previously-trained machine-learning model;

storing the one or more policy attributes extracted from the unstructured policy document as structured, field-labeled policy attributes in a network-accessible policy library;
receiving, via the computer network, a request for a user to access the technical data file;
recognizing one or more user attributes of the user; and
providing the user, network access to the technical data file stored in the network-accessible technical data repository after verifying that the one or more user attributes do not conflict with the one or more policy attributes stored in the network-accessible policy library or an additional attribute corresponding to the technical data file.

2. The method of claim 1, wherein a result of a request verification is stored in an access monitoring log.

3. The method of claim 2, wherein the result of a transaction related to the network-accessible technical data repository is stored in the access monitoring log.

4. The method of claim 1, wherein the previously-trained machine-learning model is updated based on contents of an access monitoring log configured to store logged authorization decisions corresponding to the technical data file.

5. The method of claim 1, wherein providing the user, network access to the technical data file stored in the network-accessible technical data repository comprises providing granular access to the technical data file, and wherein a level of granularity provided to the user is determined based on the one or more policy attributes and the one or more user attributes.

6. The method of claim 5, wherein the one or more user attributes comprise at least subject attributes related to credentials of the user.

7. The method of claim 5, wherein the one or more user attributes comprise at least context attributes related to metadata associated with the request for access.

8. The method of claim 5, wherein the one or more policy attributes comprise at least subject attributes related to credentials of the user.

9. The method of claim 5, wherein the one or more policy attributes comprise at least context attributes related to metadata associated with the request for access.

10. The method of claim 5, wherein the one or more policy attributes comprise at least action attributes related to the level of granularity.

11. The method of claim 1, further comprising:
responsive to a first condition wherein the one or more user attributes do not conflict with the one or more policy attributes stored in the network-accessible policy library for the technical data file, but are insufficient to provide the user network access to the technical data file stored in the network-accessible technical data repository, retrieving the additional attribute stored in a network-accessible policy information point; and
providing the user network access to the technical data file stored in the network-accessible technical data repository after verifying that there is no conflict among the additional attribute, the one or more user attributes, and the one or more policy attributes stored in the network-accessible policy library for the technical data file.

12. The method of claim 1, further comprising:
associating the one or more policy attributes extracted from the unstructured policy document with predetermined attribute fields indicated by the previously-trained machine-learning model; and outputting one or more structured, field-labeled policy attributes for storage in the network-accessible policy library.

13. A system, comprising:
a network-accessible technical data repository configured to receive a technical data file over a computer network, to securely store the technical data file, and to restrict access to the technical data file;
a policy management system configured to computer-analyze an unstructured policy document corresponding to the technical data file with a previously-trained machine-learning model configured to extract one or more policy attributes from unstructured policy documents, and to associate the one or more policy attributes with predetermined attribute fields indicated by the previously-trained machine-learning model;
a network-accessible policy library configured to store the one or more policy attributes extracted from the unstructured policy document as structured, field-labeled policy attributes; and
an authorization module configured to receive a request for a user to access the technical data file, to recognize one or more user attributes of the user, and to provide the user network access to the technical data file stored in the network-accessible technical data repository after verifying that the one or more user attributes do not conflict with the one or more policy attributes stored in the network-accessible policy library or any additional attributes corresponding to the technical data file.

14. The system of claim 13, further comprising:
an access monitoring log configured to store logged authorization decisions corresponding to the technical data file.

15. The system of claim 14, wherein the previously-trained machine-learning model is updated based on contents of the access monitoring log.

16. The system of claim 13, wherein the network-accessible technical data repository is located in a first jurisdiction, wherein the user is located in a second jurisdiction, and wherein the unstructured policy document governs access to the technical data file for users located in the second jurisdiction.

17. The system of claim 13, wherein the authorization module is further configured to:
responsive to a first condition wherein the one or more user attributes do not conflict with the one or more policy attributes stored in the network-accessible policy library for the technical data file, but are insufficient to provide the user network access to the technical data file stored in the network-accessible technical data repository, retrieve any additional attributes stored in a network-accessible policy information point; and
provide the user network access to the technical data file stored in the network-accessible technical data repository after verifying that there is no conflict among the additional attributes, the one or more user attributes, and the one or more policy attributes stored in the network-accessible policy library for the technical data file.

18. The system of claim 13, wherein the one or more policy attributes extracted from the unstructured policy document are associated with predetermined attribute fields indicated by the previously-trained machine-learning model, and wherein the policy management system is further configured to output one or more structured, field-labeled policy attributes for storage in the network-accessible policy library.

19. A method, comprising:
training a machine learning model to recognize first policy attributes of a first type from a plurality of unstructured policy documents of the first type;
training the machine learning model to recognize second policy attributes of a second type from a plurality of unstructured policy documents of the second type;
generating an integrated set of attribute fields based on a set of the first policy attributes of the first type and a set of the second policy attributes of the second type;
receiving, via a computer network, a technical data file;
securely storing the technical data file in a network-accessible technical data repository configured to restrict access to the technical data file;
computer-analyzing an unstructured policy document of the first type corresponding to the technical data file by extracting one or more policy attributes from the unstructured policy document using the trained machine-learning model;
associating the one or more policy attributes extracted from the unstructured policy document of the first type with the integrated set of attribute fields; and
outputting one or more structured, field-labeled policy attributes for storage in a network-accessible policy library.

20. The method of claim 19, further comprising:
receiving, via the computer network, a request for a user to access the technical data file;
recognizing one or more user attributes of the user; and
providing the user network access to the technical data file stored in the network-accessible technical data repository after verifying that the one or more user attributes do not conflict with the one or more structured, field-labeled policy attributes stored in the network-accessible policy library or an additional attribute corresponding to the technical data file.

* * * * *